Jan. 12, 1926.　　　　　　　　　　　　　　1,569,419
N. D. CHASE
FISHWAY
Filed June 4, 1924　　　2 Sheets-Sheet 1

WITNESSES　　　　　　　　　　　　　INVENTOR
　　　　　　　　　　　　　　　Newton D. Chase
　　　　　　　　　　　　　BY
　　　　　　　　　　　　　　　　　　ATTORNEYS

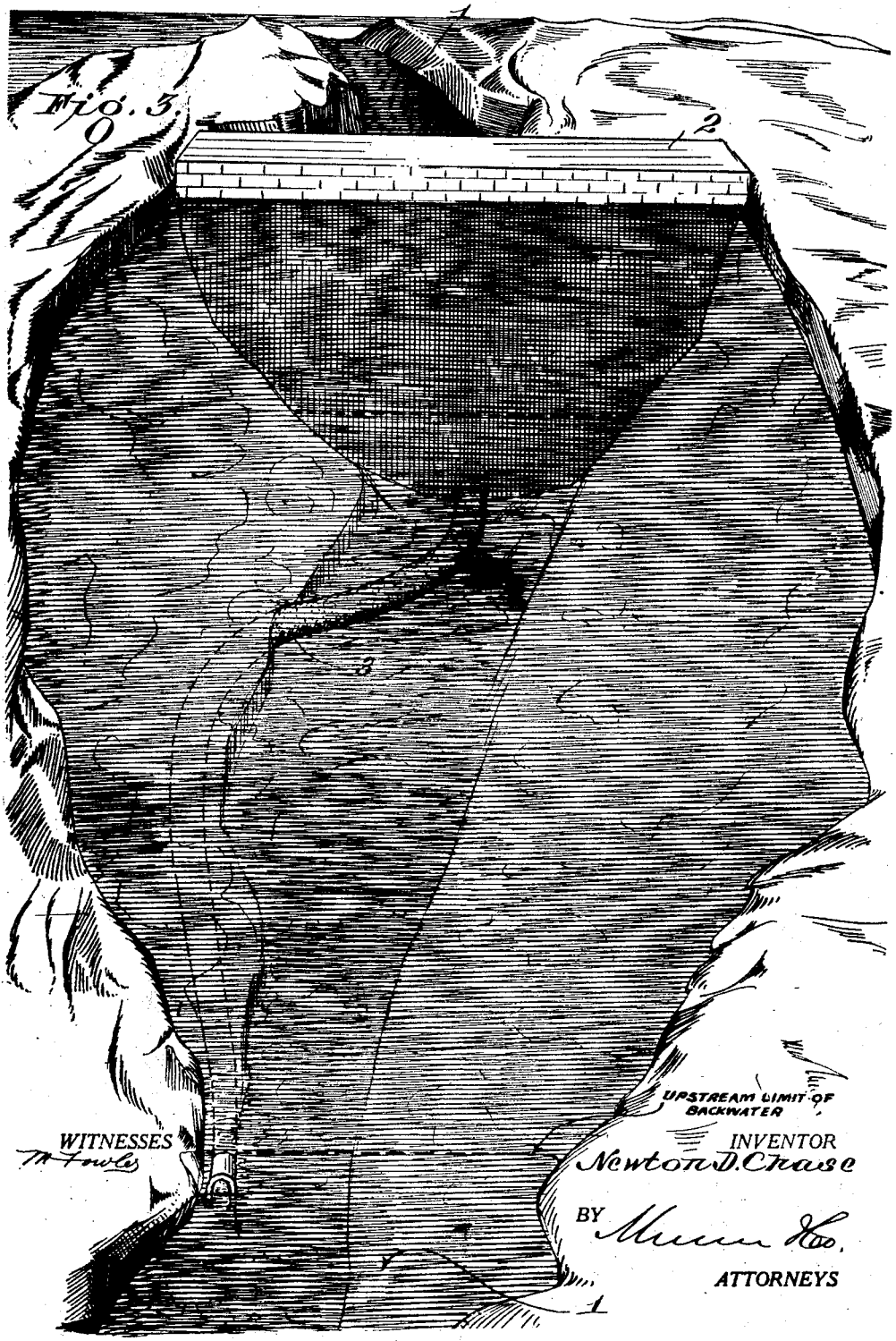

Patented Jan. 12, 1926.

1,569,419

UNITED STATES PATENT OFFICE.

NEWTON DOUGLAS CHASE, OF HORNBROOK, CALIFORNIA, ASSIGNOR OF ONE-THIRD TO R. S. STRYKER, OF HORNBROOK, CALIFORNIA.

FISHWAY.

Application filed June 4, 1924. Serial No. 717,755.

*To all whom it may concern:*

Be it known that I, NEWTON D. CHASE, a citizen of the United States, and resident of Hornbrook, in the county of Siskiyou and State of California, have invented certain new and useful Improvements in Fishways, of which the following is a specification.

My invention relates to improvements in fishways, and it consists in the combinations, constructions and arrangements herein described and claimed.

An object of the invention is to provide a fishway which is adapted to be associated with a dam or like obstruction in a stream of water and which then affords facilities for the passage of fish along a grade substantially the same as that of a bed of the stream from the water below the dam or obstruction to water in the stream above the dam or obstruction.

A further object of the invention is to provide a fishway of the character described which will not interfere with the operation of the dam in the usual manner nor impair the efficiency of the dam in any respect.

A still further object of the invention is to provide a fishway of the character described which will require but very little, if any, attention after it has been initially installed and which comprises no relatively moving parts which would be likely to get out of order easily.

Other objects and advantages will be apparent from the following description, considered in conjunction with the accompanying drawing, in which—

Figure 1:
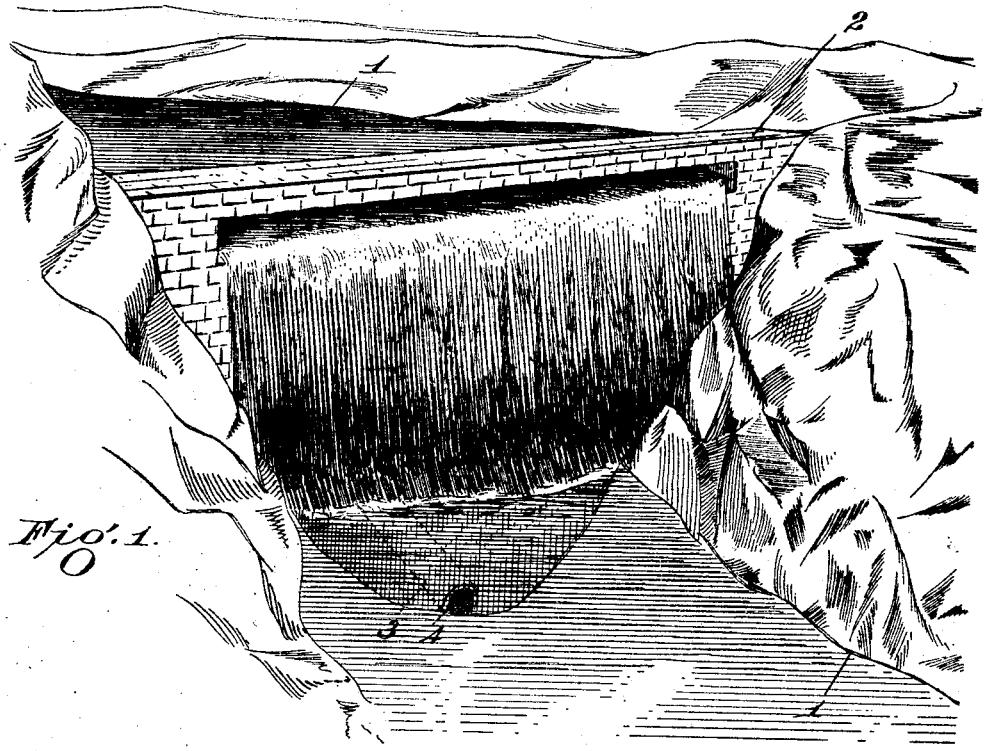
Figure 2:
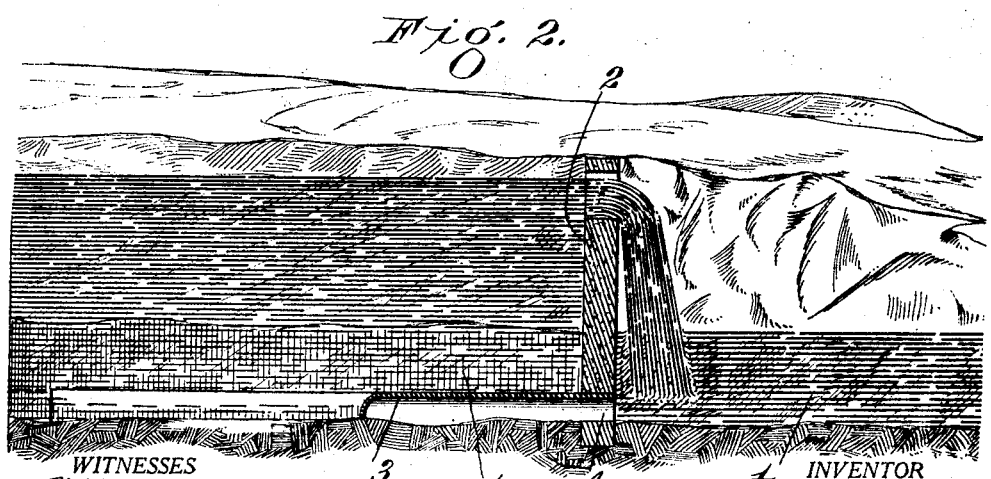

Figure 1 is a perspective view of a dam and adjacent portions of the stream in which the dam is provided, showing a fishway embodying the invention, the view being taken from a point which is located downstream from the dam looking in the direction of the dam, Figure 2 is a vertical section through the dam and part of the fishway, the view being taken along a line extending longitudinally of the stream, Figure 3 is a perspective view of the dam and adjacent portions of the stream, looking downstream from a point which is located above the dam and showing the manner in which the fishway is associated with the dam.

In the drawings, the numeral 1 designates a stream of water flowing through the land and 2 is a dam across the stream. The stream 1 may be of any given width and the dam 2 may be of any suitable known type of construction. It is desirable that fish shall be permitted to pass upstream from water below the dam and that the line of travel which the fish may take in passing from water below the dam to water above the dam shall be along a grade closely approximating the grade of the bed of the stream and proximate to the bed of the stream. To the end that passage of fish in the manner just mentioned shall be permitted wtihout any impairment of the dam resulting therefrom, my invention provides a fishway in the form of a tubular conduit 3 which opens at one end in the water of the stream at a point farther upstream from the dam than the upper limit of the back water which is retained or kept in check by the dam. The conduit 3 opens at its other or lower end through the lower portion of the dam 2 at or close to the level of the bed of the stream at or near the deepest part of the stream, as indicated at 4 in Figs. 1 and 2. The conduit 3 preferably extends laterally of the deepest portion of the stream at a slight distance above the dam 2 and then extends for the remainder of its length in a relatively shallow portion of the stream, either on the bed of the stream or beneath the bed of the stream to a point upstream from the back water which is retained by the dam. If desired, the conduit 3 may be extended either underground or on the surface along the bank of the stream to a suitable distance upstream from the dam and then placed in communication with the stream by means of a shallow trench or ditch, not shown. This may be done to advantage in event that the backwater extends a relatively great distance upstream since the necessity for extending the conduit the full length of the back water thus will be obviated.

The conduit 3 should extend from its lower to its upper end along a grade closely approximating that of the bed of the stream and should receive sufficient water at all times to permit of the passage of fish therethrough, irrespective of the level of back water which is retained by the dam. The conduit 3 may be of any suitable construction and may be made of any suitable material, such as concrete, tile, metal tubing and the like. The conduit may be of any suitable size and may be sufficiently large to permit the passage of a person therethrough when the water has been diverted therefrom so that the conduit may be cleaned if required or if it is desired to enter the conduit for any other cause. Electrical conductors may be disposed in the conduit 3 when the latter is installed and electric lamps may be associated therewith so that the interior of the conduit may be lighted when desired. Also, traps (not shown) may be disposed in the conduit at various points therealong if it is desired to catch and confine fish which may pass into the conduit from the water below the dam. A gate, not shown, may be placed at the lower end of the conduit to prevent passage of fish into the conduit when desired at any given time.

Since the conduit 3 opens at its upper end above the backwater, it is obvious that the presence of the conduit will not in any way impair the efficiency of the dam and that the conduit will not be subjected to any undue stress. The bottom of the conduit is to be formed as nearly as possible like the bed of the stream.

I claim:—

1. A fishway for a stream of water having an obstruction thereacross comprising a closed conduit opening at one end through the obstruction below the level of the water in the stream and extending upstream from the obstruction beyond the limit of the backwater which is caused by the obstruction in the stream and then opening into the stream.

2. A fishway for a stream, having an obstruction therein, comprising a closed conduit opening at one end through the lower portion of the obstruction below the level of the water in the stream below the obstruction and opening at its other end into the stream upstream from the limit of the backwater which is retained by the obstruction, said conduit extending on a grade substantially the same as that of the bed of the stream.

NEWTON DOUGLAS CHASE.